Nov. 17, 1970  H. L. STANLEY  3,540,317
METHOD OF MAKING SAW BLADES
Filed Dec. 12, 1967
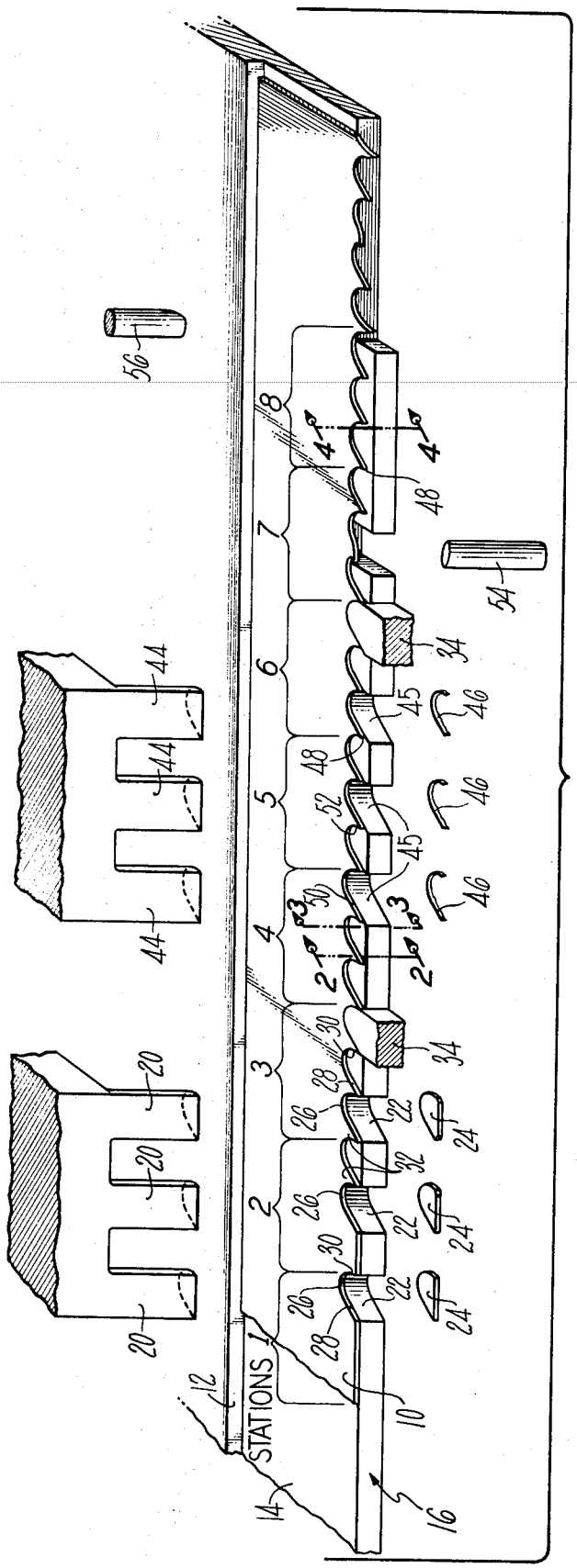
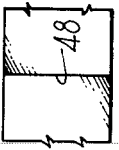
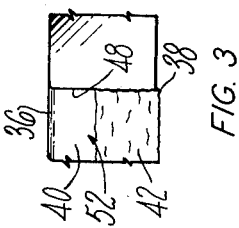
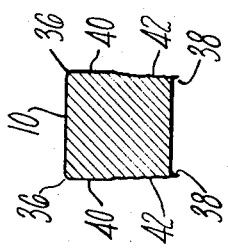
INVENTOR.
HARRY L. STANLEY
BY Lindsey, Prutzman and Hayes
ATTORNEYS

United States Patent Office 3,540,317
Patented Nov. 17, 1970

3,540,317
METHOD OF MAKING SAW BLADES
Harry L. Stanley, Newington, Conn., assignor to The Capewell Manufacturing Company, Hartford, Conn., a corporation of Connecticut
Filed Dec. 12, 1967, Ser. No. 689,851
Int. Cl. B23d 63/00
U.S. Cl. 76—112                                    11 Claims

ABSTRACT OF THE DISCLOSURE

The method of making saw blades from strip stock in a single pass through a punch press by punching the gullets between the teeth and then shaving a thin continuous sliver from the full periphery of each gullet in a subsequent punching operation to produce full sharp teeth free of surface imperfections with both the punching and the shaving of adjacent gullets being performed sequentially. A progressive die having punches of identical configuration with those used for shaving being of slightly larger dimension and positioned to make overlapping cuts in both forming and shaving the gullets is also disclosed.

---

This invention relates to a method for making saw blades and more particularly to the manufacture of saw blades in a punch press operation.

At the present state of the art, the manufacture of saw blades by punch press operation is less than satisfactory due to the fact that the cutting edges of the teeth formed by the operation of the punch press cannot be made satisfactorily clean and sharp. Even with a very sharp punch and die and close tolerances, the points and edges of the teeth tend to be rounded on one side and burred and receding on the other. However, with the unique method described herein, it is possible to economically manufacture, through a series of punch press operations performed on strip stock in a single pass through the press, a full sharp saw blade having teeth, substantially devoid of surface imperfections.

An object of this invention is to provide a unique and economical method of making a full sharp saw blade from strip stock by punch press operation.

Still another object is to provide a method of manufacture of a saw blade by punch press operation wherein the resulting blade has full sharp strong teeth which are essentially devoid of surface imperfections for increased strength against fatigue failure and breakage.

A further object of the invention is to provide a method for the manufacture of a saw blade by the continuous operation of a single punch press using a progressive die. Included in this object is the provision of a progressive die for the complete fabrication of the saw blade in a single pass therethrough.

Another object of the invention is to provide a method for the manufacture of saw blades wherein adjacent gullets defining the teeth of the blade are formed sequentially in separate and distinct operations.

A still further object of this invention is to provide a method for the manufacture of saw blades by punch press operation involving the sequential punching of adjacent gullets forming the teeth by two overlapping cuts and the sequential shaving of the adjacent gullets by two overlapping cuts to provide a full sharp, burr-free tooth construction devoid of surface imperfections.

Other objects will be in part obvious and in part pointed out more in detail hereinafter.

The invention accordingly consists in the features of construction, combination of elements and arrangement of parts which is exemplified in the construction hereafter set forth, and the scope of the invention is indicated in the appended claims.

In the drawings:

FIG. 1 is a diagrammatic view of the present invention showing in schematic perspective the progressive die utilized in the practice of the invention and the progresive scrap pattern as the strip stock passes through the several stations of the die;

FIG. 2 is an enlarged fragmentary cross-sectional view taken along the lines 2—2 of the saw blade of FIG. 1;

FIG. 3 is an enlarged fragmentary cross-sectional view taken along line 3—3 of the saw blade of FIG 1; and FIG. 4 is an enlarged fragmentary sectional view taken along line 4—4 of the saw blade of FIG. 1.

In the drawings, in which like numerals refer to like parts throughout the several views, the invention is illustrated with reference to a saw blade having three teeth per inch, although it applies equally to the manufacture of a saw blade having any tooth pitch.

It is believed that the nature of the invention, its advantages and characteristic features, can be best understood by describing the progress of strip stock through the various stations of the progressive die illustrated in FIG. 1. For purposes of the following description, the scrap pattern of the strip stock illustrated in FIG. 1 assumes that the press has been operated to the point where the punches at each successive station have just passed completely through the stock.

Referring now specifically to FIG. 1, a coil of a strip stock 10 of suitable thickness and composition for saw blade use is fed into the progressive die at Station 1 and is held against a shoulder 12 on its untoothed back edge and against the supporting surface 14 of die 16 by any suitable means (not shown). As Station 1, a punch 20 cooperates with a suitable die recess 22 of similar cross-sectional configuration to blank out a slug 24 in the toothed edge of the strip to rough form the gullet or tooth root 26, of essentially the size and shape desired in the finished saw blade, between the leading face 28 and the trailing face 30 of adjacent teeth 32. Locating pilots 34 shown as being at Stations 3 and 6 are provided to locate the strip with reference to a previous gullet formed at Station 1 to assure the desired spacing of teeth.

After the stock 10 has been acted upon at Station 1 of the illustrative die of FIG. 1, it is indexed forwardly to Station 2 where another slug 24 is blanked out of the stock by another punch 20, which makes a cut which overlaps the gullet 26 previously formed at Station 1, to rough form the gullet 26 of another tooth.

The stock 10 is then indexed forwardly to Station 3, where another punch 20 and die recess 22 identical to those at Stations 1 and 2 punches an additional slug 24 from the strip 10 to rough form the remaining gullet required in the manufacture of a 3 pitch saw blade.

It should be noted that, while the illustrative embodiment discloses the punching of a single slug 24 to form a single gullet 26 at a single station, any number of gullets may be punched at any station, and any number of stations may be used in rough forming all the gullets so long as adajacent gullets are punched sequentially so as to accommodate overlapping cuts in forming adjacent gullets.

FIG. 2 illustrates the surface conditions of the rough formed gullets. As shown, the stock 10 is deformed during the removal of the large slug 24 and is rounded as at 36 where the punch enters the stock. Moreover, while the first portion 40 of the surface following the rounded edge 36 is sheared or cut cleanly, the following surface portion 42 is torn and recedes from the cleanly sheared edge 40 before terminating in the burr 38 at the exit side of the punch. While the relative extent of the rounded edge 36, the cleanly cut portion 40, the torn portion 42, and burr 38 depend upon different factors including the punching speed, the tolerances of the punch and die, and the characteristics of the material of the strip 10, a quality saw blade cannot result from a single punching operation.

Returning again to FIG. 1, after the strip stock 10 progresses to Station 4, it is acted upon the first one of a series of identical punches 44 and die recesses 45 which, in the illustrative embodiment, acts upon the same gullet as the punch 20 at Station 1. Punches 44 are similarly configured to punches 20 but are of slightly larger dimension so as to shave off a very thin continuous sliver 46 from the entire periphery of gullet 26. This thickness of silver 46 should, in the contemplation of this invention, be substantially equal to the amount that the torn portion 42, as shown in FIG. 2, recedes from the plane of the cut or sheared portion 40. As a result, the punch 44 is effectively cutting a thinner strip of material having a thickness substantially to the sheared portion 40 and, because of the thinness of the sliver, essentially shaves or shears the material across its entire extent to produce a gullet bounded by essentially a polished surface free from fracture initiating points. However, with the shaving of a gullet on one side of a tooth 32 only, the unshaved leading edge 50 or the trailing edge 52 of the tip of the tooth as the case may be (sse FIG. 3) contains a torn portion 42 and the cutting point 48 is jagged rather than forming a straight line.

The stock 10 is subsequently indexed to Stations 5 and 6 where the punches 44 similarly shave a sliver 46 from the gullets blanked out at Stations 2 and 3 respectively.

By virtue of the fact that adjacent teeth are shaved sequentially, the punches may, as hereinbefore described, make overlapping cuts and the surfaces of the gullets forming cutting points 48 may, as shown in FIG. 4, terminate in a single common line to provide a full sharp point devoid of radiuses, burrs, or torn receding portions. Moreover, by virtue of the shaving of a continuous sliver from the full periphery of each of the gullets of the blade, the peripheal surface of the gullets are essentially polished surfaces devoid of surface imperfections to produce a saw blade of maximum strength against fatigue, failure or fracture.

If desired, the stock may be indexed into additional Stations 7 and 8 for setting the teeth by punches 54, 56 in any desired manner. The stock may then be finished by heat treatment and/or segmented into desired lengths.

As indicated above, the punching speed is important since an increase in the number of punching operations per minute increases the portion of the stock which is sheared relative to that torn, and thus reduces the thickness of the sliver which is required to be subsequently removed by shaving by punches 44. For example, a punching speed of at least 350 strokes per minute is important for the production for a full sharp blade formed from 40 mil thick tempered saw stock in which the sliver 46 is about 4 mils thick and, preferably, the punching speed should be at least 600 strokes per minute.

From the foregoing, it will be apparent that the method of this invention utilizes the sequential punching of rough formed adjacent gullets as well as the sequential shaving of a thin sliver from the entire peripheral surface of adjacent gullet to produce a full sharp tooth structure wherein the entire peripheral surface forming the teeth has a polished finish free from burrs and other surface imperfections.

The invention accordingly comprises the several steps and the relation of one or more of such steps with respect to each of the others and the article possessing the features, properties, and the relation of elements, which are exemplified in the following detailed disclosure, and the scope of the application of which will be indicated in the claims.

I claim:
1. The method of making saw blades comprising feeding a length of strip stock through a punch and die, punching slugs from the strip to form tooth roots with adjacent tooth roots being formed sequentially, and, after said slugs are punched, shaving a thin sliver from the entire periphery of all tooth roots with adjacent tooth roots being shaved sequentially.

2. The method of claim 1 wherein overlapping cuts are made in forming adjacent tooth roots and in shaving adjacent tooth roots.

3. The method of claim 2 wherein separate punches are used in forming and shaving the tooth roots and the shaving punches are of the same cross-sectional configuration as the forming punches but are of slightly greater dimension to shave a continuous sliver from the entire periphery of the tooth roots.

4. A method recited in claim 3 wherein the thickness of the sliver removed during the shaving step is substantially equal to the amount of the exit portion of the tooth roots formed by the punches in punching the slugs recedes from the sheared portion of the tooth roots adjacent the entrance portion thereof.

5. The method of claim 4 wherein the thickness of the sliver removed is about 4 mils.

6. The method of claim 5 wherein the punching speed is about 600 punching operations per minute or more.

7. The method of claim 1 in which all the tooth roots are formed before any of the tooth roots are shaved.

8. The method of claim 1 including the step of setting the teeth to the desired pattern.

9. A progressive die for the complete manufacture of a saw blade in a continuous operation in a single pass through a punch press comprising a first plurality of punches for punching slugs from strip stock to form saw blade teeth in a series of stations through which the stock is indexed in passing through the die and a second plurality of punches to shave a continuous sliver from the entire periphery of the gullets formed between the teeth by the first plurality of punches, the punches being so positioned as to form and shave adjacent gullets sequentially.

10. A die as recited in claim 9 wherein the punches are disposed so as to make overlapping cuts of adjacent gullets in both the forming and shaving operations.

11. A die as recited in claim 10 wherein the shaving dies are of the same cross-sectional configuration as the forming dies and of a relative size to shave a sliver from the gullets of the order of 4 mils.

References Cited
UNITED STATES PATENTS

| | | | |
|---|---|---|---|
| 2,510,462 | 6/1950 | Christenson | 76—29 |
| 3,117,472 | 1/1964 | Mingus et al. | 76—112 |

BERNARD STICKNEY, Primary Examiner

U.S. Cl. X.R.

76—29